United States Patent [19]

Wilson

[11] Patent Number: 5,018,619

[45] Date of Patent: May 28, 1991

[54] CONVEYOR BELT DUMPING MECHANISM USING HORIZONTAL IDLERS AND IMPACT SLIDES

[76] Inventor: William A. Wilson, 83 Pheasant Dr., Marietta, Ga. 30067

[21] Appl. No.: 532,559

[22] Filed: Jun. 4, 1990

Related U.S. Application Data

[63] Continuation-in-part of Ser. No. 375,938, Jul. 6, 1989, Pat. No. 4,930,625.

[51] Int. Cl.$^5$ ............................................. B65G 15/60
[52] U.S. Cl. ..................................... 198/839; 209/707
[58] Field of Search ....................... 198/839, 364, 598; 209/698, 707, 922, 923, 645

[56] References Cited

U.S. PATENT DOCUMENTS

| | | | |
|---|---|---|---|
| 97,070 | 11/1869 | Gardiner | 198/364 X |
| 4,461,378 | 7/1984 | Roth | 198/839 X |
| 4,541,532 | 9/1985 | Wilson | 198/598 X |

FOREIGN PATENT DOCUMENTS 1067725 10/1959 Fed. Rep. of Germany ...... 198/839

Primary Examiner—Robert P. Olszewski
Assistant Examiner—Cheryl L. Gastineau
Attorney, Agent, or Firm—Vivian L. Steadman

[57] ABSTRACT

An array of low friction impact slides for supporting a moving conveyor belt beneath a generally crescent-shaped section of the belt opening outwardly to one side thereof and beneath portions of the belt disposed proximate to but beyond the distal ends of this section. Except for the slides, which have smooth, generally planar upper surfaces across the belt can be pulled, the crescent-shaped section is virtually unsupported. Both upstream and downstream of the crescent-shaped section, pairs of idlers slope downwardly toward each other. Where the belt is supported by two such pairs of idlers which are contiguous to each other, it assumes a trough-like configuration. Proximate the crescent-shaped section, on the other hand, the idlers are unpaired and disposed horizontally. These unpaired idlers are largely, if not entirely, disposed beneath the same side of this section. When force is applied which causes a sufficiently large, heavy object to move transversely across the crescent-shaped section, the weight of the object causes the belt to assume a shape determined by the upper surface of the slides. These upper surfaces are so oriented generally that the crescent-shaped section, when weighted, takes on the shape of a channel which feeds the oversized object toward the edge of the belt.

1 Claim, 4 Drawing Sheets

CONVEYOR BELT DUMPING MECHANISM USING HORIZONTAL IDLERS AND IMPACT SLIDES

CROSS-REFERENCE TO RELATED APPLICATION

This application is a continuation-in-part of application Ser. No. 375,938, filed July 6, 1989, now U.S. Pat. No. 4,930,625.

BACKGROUND OF THE INVENTION

This invention relates to the removal of objects from a moving belt. Of particular interest are devices for facilitating a separation, on the basis of size, of mixtures of larger and smaller solids travelling on a conveyor.

Prior to the invention disclosed in my pending U.S. patent application identified above, burden on a conveyor belt was held in a trough formed by the belt and a plurality of pairs of idlers. The idlers in each of these pairs were positioned near opposite edges of the belt and mounted so that the outer end of each idler was disposed upwardly, with the edges of the belt forming the lips of the trough to keep material on the conveyor from falling off inadvertently. These lips, however, hindered efforts to dislodge oversized objects from the moving belt. When devices were employed to deflect such objects sideways, for instance, the devices had to be capable of exerting a large side force. Otherwise, the objects could not be moved past the raised belt lip. But forces of the magnitude required tended to damage both the material and the belt itself.

In the U.S. patent application identified above, there has been disclosed a moving conveyor belt, a short section of which is supported only by idlers offset to one side of the longitudinal centerline of the belt. Each of these idlers is rotatably mounted in a horizontal position, disposed perpendicularly to the centerline and spaced apart from each other. The overall placement of these offset idlers relative to other idlers supporting the belt is such that a crescent-shaped section unsupported by idlers is provided in the moving conveyor belt at any given instant.

When large objects in the burden on the conveyor are deflected onto the crescent-shaped section, it not only flattens but may also sag excessively, especially when the belt is loaded to full capacity and the belt is soft or worn. If it sags downwardly to a sufficient extent, a chute is created. Unfortunately, in some applications, such as those involving mixtures of gravel and very large rocks, a substantial portion of the burden tends to slide into the chute and off the belt along with each oversized object.

SUMMARY OF THE INVENTION

The subject invention is directed to improvements over applicant's prior teachings by way of an array of low friction impact slides disposed beneath the crescent-shaped section of the belt. The array of slides provides for the retention of the main body of the burden carried on the conveyor belt while simultaneously facilitating the removal of oversized objects as they are being deflected sideways across the belt. A dislodging impact may be imparted to such objects by one or more rakes rotatably mounted above the belt. In the preferred embodiment, side kick rakes described by Wilson in U.S. Pat. No. 4,541,532 are employed.

A further improvement is the provision of supports for the belt which can be used both to control the amount of sag of the outer edge of the belt bounding the crescent-shaped section and to "fine tune." to a greater extent than is practicable with idlers alone, the shape of the trough formed in the belt both immediately upstream and immediately downstream of this section. Such "fine tuning" is useful in keeping burden, such as undersized stone, on the belt.

A still further object is to reduce friction between the belt and any surfaces below it with which it may come into contact when a channel is formed in the belt as a result of a heavy, oversized object being removed from it.

A still further object of the present invention is to provide an apparatus which can be used simultaneously to reduce the impact forces which otherwise must be applied to dislodge large, heavy objects from a conveyor belt and to reduce stress on the belt associated with the dislodging process.

In accordance with the present invention, low friction impact slides, each of which is characterized as having a smooth, approximately planar upper surface which is substantially shorter in length than the greatest transverse width of the crescent-shaped section, are disposed in an array beneath this section. Each of the slides is positioned with its upper surface at a height of about 1 to 2 inches below that of the top of the idler roller nearest the slide, so that the belt can sag slightly under the weight of the material burden but not go limp. The height of each slide is adjusted to accomodate variations in belts and in the material burden depth. When the slide heights are properly positioned, the performance of the side kick rakes in sizing the burden. even with a worn belt, is greatly enhanced. Otherwise. too much sagging may occur to allow the rakes to perform a final sizing of the burden.

With the exception of a single slide which, if present, is situated furthest downstream in the array, the slides are disposed, for the most part, in pairs. In the preferred embodiment, the slides in each pair are aligned longitudinally with each other and extend perpendicularly from an imaginary line disposed parallel to and beneath the centerline of the belt. Preferably, the single slide is omitted when the belt is of the heavy duty, ridged type.

Each of the pairs of slides aligned longitudinally with each other is also disposed along an imaginary line which lies generally within a vertical plane that passes through one of the hubs of the wheels of the side kick rakes. So situated, the slides are in position to support those portions of the belt where large objects, following their impact with the rakes, tend to be deflected. Moreover, each of the slide is generally spaced apart from contiguous pairs of idlers offset to the opposite side of the centerline of the belt from the slides, so that the slides and the idlers are staggered, or set alternately, on either side of the belt centerline. In this staggered arrangement, the idlers are preferably placed near the leading edges of the rakes so that the idlers support the belt where the forces of the impact between the rakes and any objects being carried on the belt to be greatest.

Further, the angle at which the upper surface of each of the slides is inclined relative to the horizontal depends upon the proximity of the slide to the centerline of the belt. The upper surfaces of the inner and outer members of each of the pairs of slides are, respectively, disposed horizontally and inclined downwardly towards the centerline of the belt. The angle at which any one of the outer members disposed beneath the crescent-shaped section is inclined downwardly is less than the angle at which any of the outer members so disposed upstream of it is inclined. When weighted down by a heavy, oversized object, that portion of the belt passing over the array of slides forms a generally flat-bottomed channel directed toward the edge of the belt away from the idlers.

In an alternate embodiment, the slides in at least one pair of slides situated beneath the crescent-shaped section are aligned side by side with each other generally and parallel to the belt centerline. When only one pair of slides are so aligned, this pair of slides is preferably positioned beneath the crescent-shaped section about midway between its distal ends. The inner and outer members of this pair of slides are disposed horizontally and inclined downwardly towards the belt centerline, respectively.

DESCRIPTION OF THE PREFERRED EMBODIMENT

Figure 1:
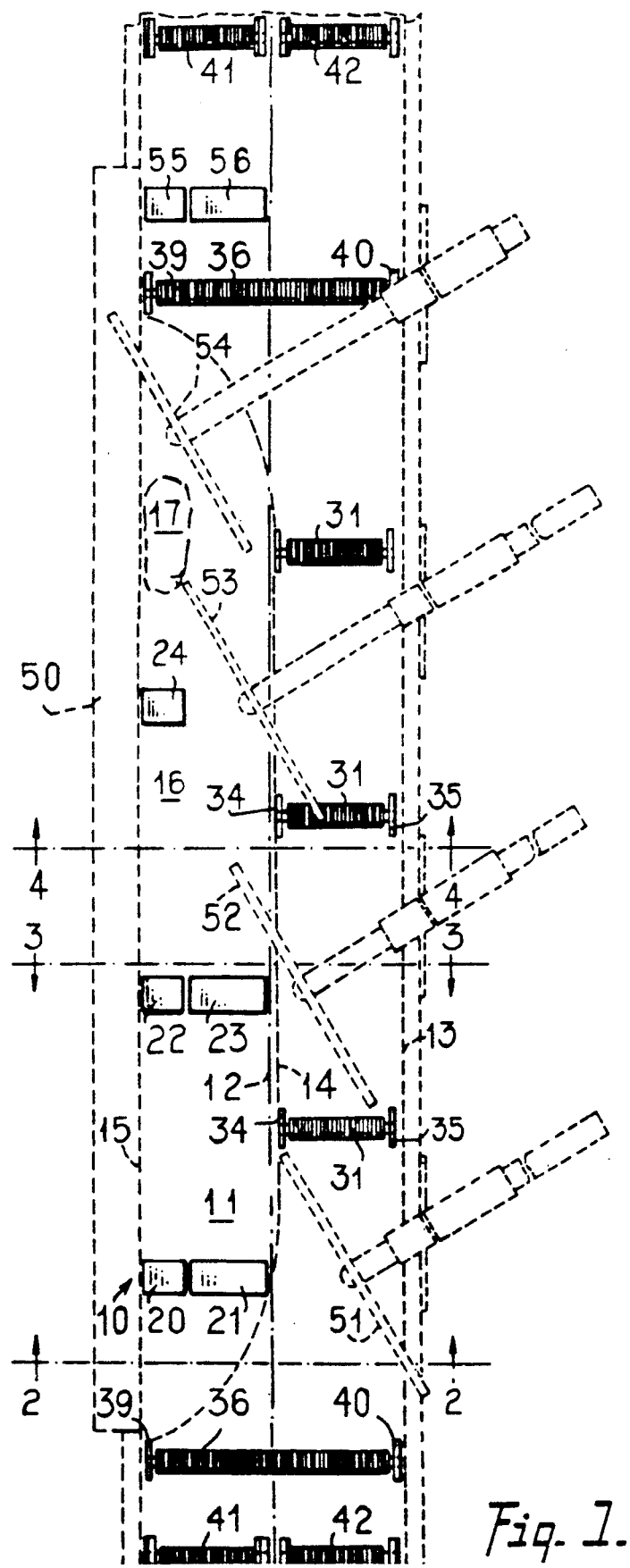
FIG. 1 is a plan view in which the placement of the low friction impact slides, of the idlers and of the belt according to the present invention is shown schematically, the belt and rakes which are employed to deflect oversized objects sideways across the belt being shown in dashed lines.

Referring to FIGS. 1-6, an apparatus according to the present invention includes an array 10 of low friction impact slides 20-24 and horizontally mounted impact idlers 31, 36 over which a conveyor belt 11 travels. Both upstream and downstream of the array 10 and the idlers 31, 36, the belt 11 is supported by pairs of idlers 41, 42. The array 10 is disposed beneath a short, crescent-shaped section 16 of the belt 11 which, except for the slides 20-24, is virtually unsupported. The idlers 36, 31 are themselves disposed beneath the distal ends of the crescent-shaped section 16 and beneath portions of the belt 11 situated generally on the opposite side of the belt centerline 12 from this section, respectively.

One end of each of the idlers 31 lies along an imaginary arc 14 which opens towards an outer edge 15 of the belt 11. The section 16 is disposed within the portion of the belt 11 lying between the edge 15 and points directly above the arc 14 at any particular instant of time. The section 16 is sized and situated so that any burden 18 carried by the conveyor tends to remain on it unless a force is specifically applied to deflect objects with the burden laterally. When a large, heavy object 17 in the burden 18 carried by the conveyor is deflected onto the section 16, the belt 11 sags slightly, forming a temporary channel 19 which feeds the object towards the belt edge 15. In order to help keep an object 17 as it exits the channel 19 away from the conveyor, a fixed chute 50 is preferably attached to structure (not shown) beneath points where the channel can form.

The array 10 can be used in conjunction with a series of side kick rake wheels 51, 52, 53, 54, with the wheels being employed to deflect oversized objects 17 from the belt 11. The construction and operation of suitable rake wheels is disclosed by Wilson in U.S. Pat. No. 4,541,532. In the preferred embodiment illustrated in FIG. 1, the idlers 36 are positioned, by way of example, approximately 12 inches upstream of the leading edge of the first wheel 51 and approximately 12 inches downstream of the trailing edge of the last wheel 54. Preferably, the furthest downstream shorter idler 31 is also placed close behind the leading edge of the furthest downstream wheel 54 to provide good support for the belt 11. A small overlap of the leading edge of the wheel 53 and the idler 31 is acceptable.

In the preferred embodiment illustrated in FIGS. 1-6, pairs of slides 20, 21; 22, 23 are aligned longitudinally with each other and extend perpendicularly from an imaginary line disposed parallel to and located downwardly of the centerline 12. Thus each pair of slides comprises an inner and outer member. The number of pairs of slides included in the array 10 depends upon the condition of the belt 11, with more slides being needed when a soft or older worn belt is used. The array 10 may include a single slide 24 which is situated downstream of the paired slides 20, 21; 22, 23. Preferably, the single slide 24 is omitted from the array 10 when the belt 11 is of the heavy duty, ridged type. A gap which measures, by way of example, 1 to 2 inches separates the contiguous ends of the paired slides 20 and 21; 22 and 23.

Each of the slides 20-24 has a smooth, elongated, approximately planar upper surface 25-29, respectively, which is substantially shorter in length than is the greatest transverse width of the crescent-shaped section 16 (FIG. 1). The preferred length of each of the upper surfaces 25-29 depends upon its proximity to the centerline 12. The upper surface of each of the inner slide members 21, 22 measures, by way of example, about 10 inches in length while the upper surfaces of the outer slide members 20, 22, 24 are typically in the range of 6 to 8 inches in length. The overall length of a pair of longitudinally aligned slides 20, 21; 22, 23 is preferably at most about 18 inches.

Likewise, each of the idlers 31 is preferably at most 18 inches in length. Even for belts up to 72 inches in width, the preferred length for the idlers 31 is only 18 inches, with 12 inch and 18 inch long idler rollers 32 being recommended for 42 inch wide or wider belts 11, respectively.

Figure 2:
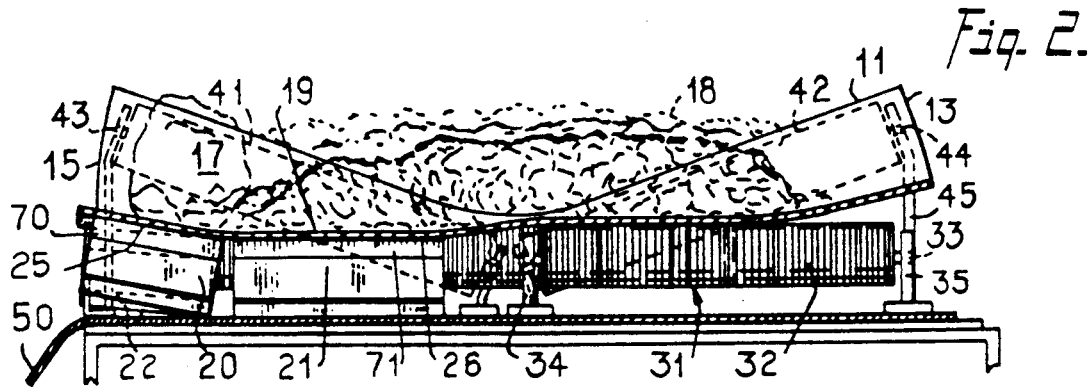
FIGS. 2 and 3 are side elevational views on an enlarged scale taken along lines 2—2 and 3—3, respectively, of FIG. 1 in which the mounting of a pair of low friction impact slides is shown in detail, the position of an oversized object being shown in dashed lines.
Figure 3:
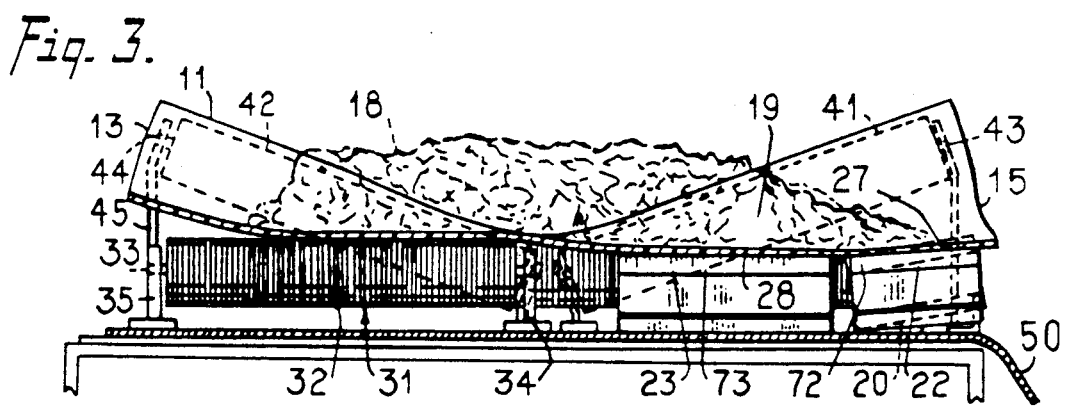
Figure 4:
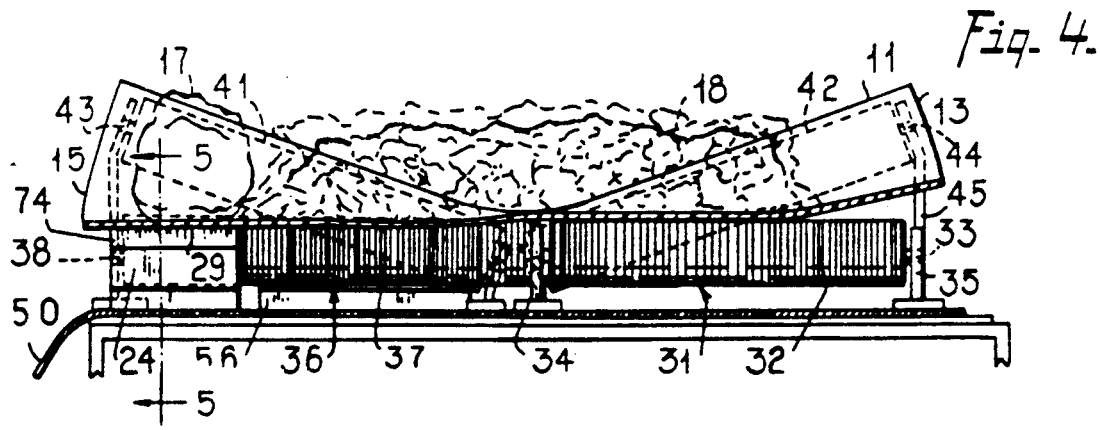
FIG. 4 is a side elevational view on an enlarged scale taken along line 4—4 of FIG. 1 in which is shown the mounting of a low friction impact slide proximate the preferred point for the discharge of oversized objects from the belt, the position of an oversized object being shown in dashed lines.

As is best seen in FIGS. 2 through 4, whether the upper surface 25-28 of each of the slide 20-23 is inclined relative to the horizontal depends upon the proximity of the slide to the belt centerline 12. The upper surfaces 25, 27 of the inner members 20, 22 are disposed horizontally while the upper surfaces 26, 28 of the outer members 21, 23 are inclined downwardly towards the centerline 12 of the belt 11. The angles at which the upper surfaces 26, 28 of the outer members 21, 23 are inclined measure, by way of example, 10 degrees and 5 degrees, respectively. This pattern of a diminishing angle of inclination the further the outer member is situated downstream is continued with the slide 24. The upper surface of the slide 24 is preferably disposed horizontally. When weighted down by a heavy, oversized object 17, that portion of the belt 11 passing over the array 10 of slides 20-24 forms a temporary, generally flat-bottomed channel 19 directed toward the belt edge 15 away from the idlers 31.

The bottom surface of the belt 11 along that portion of it forming the channel 19, when the channel is fully formed, is situated atop the upper surfaces 25, 27, 29 of the slides 20, 22, 24. The surfaces 25, 27, 29 are themselves disposed at heights in the range of about 1 to 2 inches below the plane of the horizontally mounted idlers 31, 36. When the belt 11 is not weighted down with a large, heavy object, the end of each of the slides 21, 23, 24 closest to the belt edge 15 is positioned below the edge 15. Of the slides 20-21, the slide 21 is generally set at the greatest depth relative to the idlers 31. At the same time, the wheel 51 is set at the greatest height relative to the bottom of the belt 11. The elevations of the slides 23 and 24 are each greater than that of the slide 21 while the heights wheels 52, 53, 54 are successively diminished relative to that of the wheel 51, thereby facilitating sizing of the material burden 18.

In the array 10, each of the slides 20-24 is mounted beneath imaginary lines disposed perpendicularly to the belt centerline 12 and within vertical planes that pass through the hubs of the wheels 51, 52, 53 of the side kick rakes (FIG. 1). The slides 20-24 are in position to support those portions of the belt 11 most likely to be impacted by large heavy objects when they are deflected sideways across the crescent-shaped section 16 by the side kick rakes.

Both upstream and downstream of the array 10, pairs of idlers 41, 42 slope downwardly toward each other on either side of the belt centerline 12. Supported by the paired idlers 41, 42, which are disposed at an angle to the horizontal which measures, by way of example, 20 degrees, the belt 11 resembles a trough, the walls of which are useful in retaining the burden 18 on the conveyor. In a situation in which the belt 11 is fully loaded and worn or soft, some of the burden 18 may be spilled from it unless a pair of slides 55, 56 is disposed between the idler 36 situated at the downstream end of the crescent-shaped section 16 and that one of the paired idlers 41, 42 which is contiguous with this downstream idler 36 and the belt edge 15. The outer slide member 56 is preferably inclined at an angle with respect to the horizontal which is in the range 5 degrees to 10 degrees.

In most applications, the belt 11 travels at speeds between 350 feet and 1200 feet per minute, leading to rapid wear on moving parts in contact with the belt. Unlike the idlers 31, 36 which have rollers 32, 37 on shafts 33, 38 that turn in bearing blocks 34, 35; 39, 40, none of the slides 20-24 has any moving parts. The absence of moving parts in the slides 20-24 eliminates the possibility that the slides will fail due to bearing seizure, the leaking of seals, or the bending of a shaft under load or impact. Such failures would result in extended downtimes. But with the slides 20-24, top pieces 70-74 of urethane bonded to rubber are the only parts likely to wear out. When these top pieces do wear out, the slides 20-24 are readily replaceable, with very little downtime.

Figure 7:
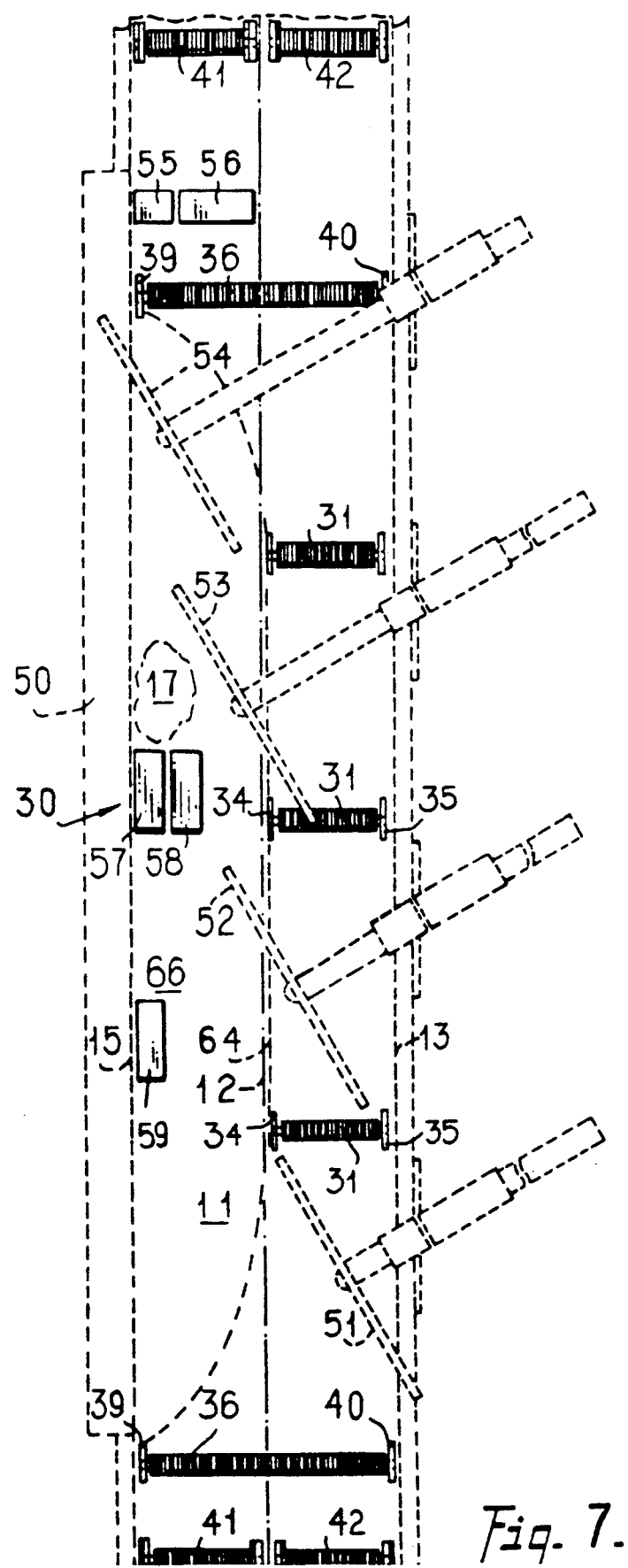
FIG. 7 shows a modification of FIG. 1 with a different placement of the low friction impact slides.

In an alternate embodiment illustrated in FIG. 7, a single slide 59 and a pair of slides 57, 58 aligned side by side with each other are situated beneath the crescent-shaped section 66 and aligned parallel to the belt centerline 12. When only one pair of slides 57, 58 is so aligned, this pair of slides is preferably positioned beneath the crescent-shaped section 66 about midway between its distal ends. The inner and outer members of this pair of slides 58, 57 are disposed horizontally and inclined downwardly towards the belt centerline, respectively. The outer slide member 57 is inclined at an angle with respect to the horizontal which is in the range 5 degrees to 10 degrees.

The slides 58 and 59 are positioned so that their upper surfaces are below the top edges of the proximate rollers 36. The slide 58 being about 1 inch below these rollers, so that the belt 11 can slag slightly under the weight of the material burden 18. The single slide 59, which is preferably used when the belt 11 is overly soft or worn, is disposed horizontally with its upper surface about 2 inches below the top edge of the roller 36 of the nearest idler 31.

Figure 5:
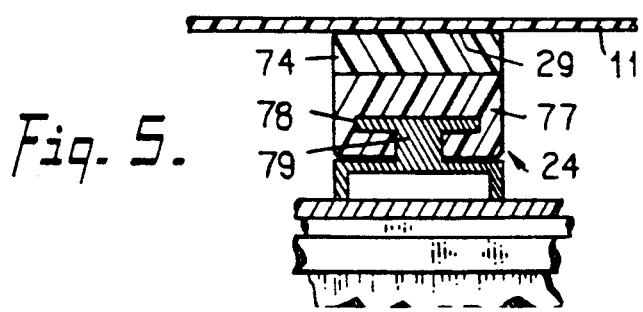
FIG. 5 is a transverse cross-sectional view of the low friction impact slide taken along line 5—5 of FIG. 4.
Figure 6:
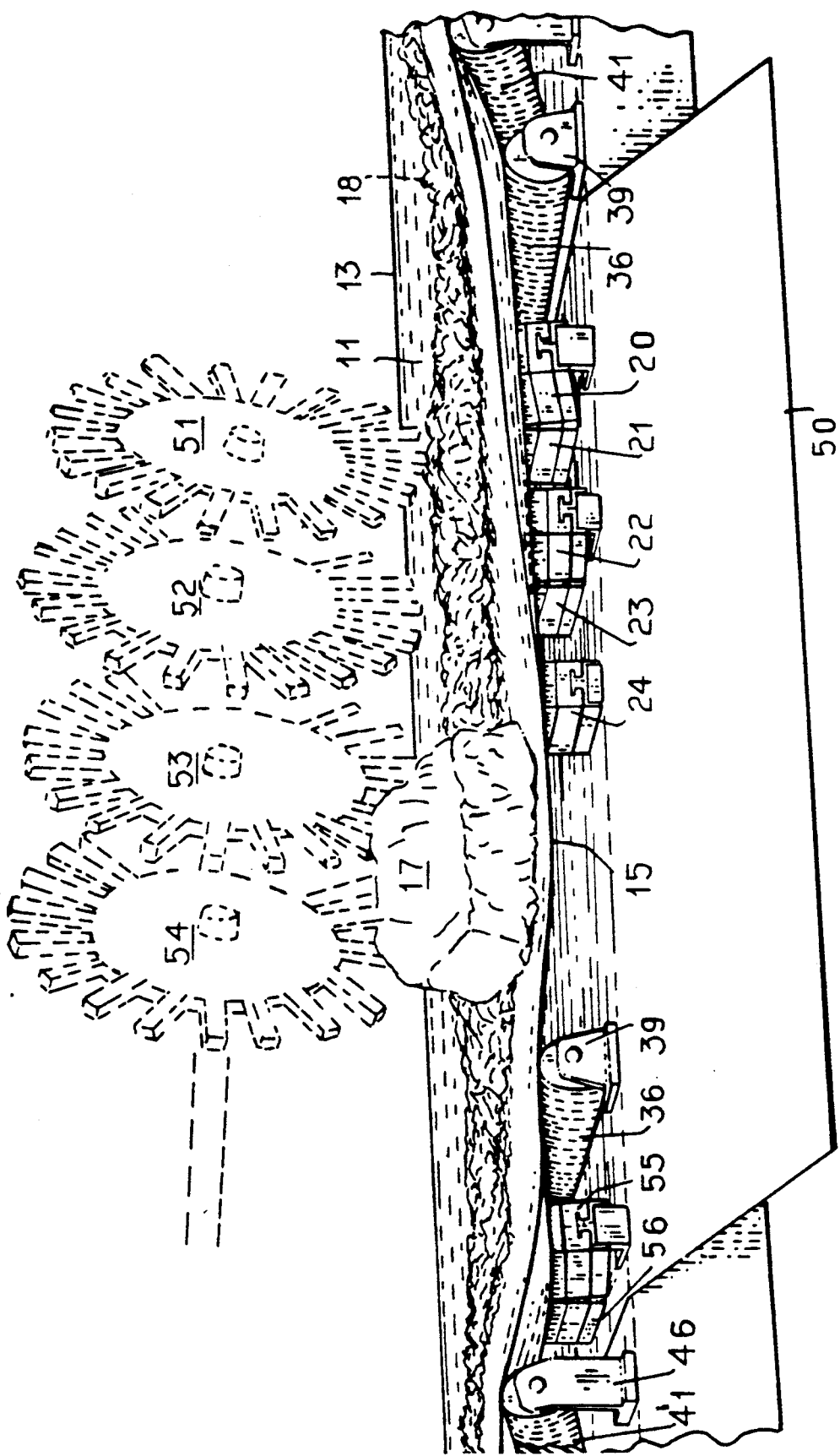
FIG. 6 is a perspective view of the apparatus according to the present invention, showing a fragmentary section of the conveyor belt; the rakes which are employed to deflect oversized objects sideways being shown in dashed lines.

As illustrated in FIG. 5, a typical low friction impact slide 24 includes a base 77 of a tough rubber, rubber-like plastic or the like to which is bonded a wear strip 74 of ultrahigh molecular weight plastic or similar material having a low coefficient of friction. Each of the low friction impact slides 20-24, 55-59 is fabricated from elongated stock which can be easily cut to length and which has a typical cross-section approximately 5 inches in width. Means, including a slot 78 which is T-shaped in cross-section and which is formed in the base 77 for fastening the slide to a steel section 79 within the conveyor belt support frame (not shown) is provided. Stock for fabricating the slides 20-24, 55-59 is available from Miller Wire Works, Inc. in Birmingham, Ala.

It is apparent from the foregoing that a new and improved apparatus for use in the removal of objects from moving belts has been provided. While only the presently preferred embodiment of the invention has been disclosed, as will be apparent to those familiar with the art, certain changes and modifications can be made without departing from the scope of the invention. These changes include, but are not limited to, variations in the placement of the low friction impact slides, including the angular orientations of the slides and the number of slides used at each location. The scope of the invention will become clear as defined by the following claims.

What is claimed is:

1. An apparatus for use with a conveyor belt supported in part by sets of paired idlers, the outer ends of the paired idlers being disposed upwardly of the inner ends thereof, so that the belt, when moving across the paired idlers, forms a trough, wherein the improvement comprises:

(a) a plurality of idlers, each of which is rotatably mounted in a horizontal position; at least two of the idlers being approximately equal in length to the width of the belt; the idlers being disposed approximately parallel to each other; idlers which are substantially shorter than said two idlers being disposed between them, each of the shorter idlers being offset with respect to the centerline of the belt and to the same side of the belt, the end of each of the shorter idlers which is closest to the centerline lying along an imaginary arc which opens towards one edge of the belt, thereby forming a crescent-shaped section in a portion of the belt passing to one side of the shorter idlers; and (b) means including a plurality of low friction impact slides mounted beneath the crescent-shaped section for supporting the crescent-shaped section, the angle at which the upper surface of each of the slides is inclined relative to the horizontal depending upon the proximity of the slide to the centerline of the belt; when weighted down by a heavy, oversized object, said portion of the belt passing over the slides forming a generally flat-bottomed channel.

* * * * *